US008648712B2

(12) United States Patent
Pottle et al.

(10) Patent No.: US 8,648,712 B2
(45) Date of Patent: Feb. 11, 2014

(54) ELECTRONIC EMERGENCY MESSAGING SYSTEM

(76) Inventors: J. Roy Pottle, Wellesley, MA (US); John F. Nagel, Southlake, TX (US); Myron D. Anduri, Fairplay, CO (US); Dave Anderson, Dillon, CO (US); Sangsoo Kim, Seoul (KR); Jaeyoun Shin, Seoul (KR); Jinkyu An, Seoul (KR); You Seung Soh, Suwanee, GA (US)

( * ) Notice: Subject to any disclaimer, the term of this patent is extended or adjusted under 35 U.S.C. 154(b) by 518 days.

(21) Appl. No.: 12/818,109

(22) Filed: Jun. 17, 2010

(65) Prior Publication Data

US 2011/0313770 A1 Dec. 22, 2011

(51) Int. Cl.

| | |
|---|---|
| ***G08B 1/08*** | (2006.01) |
| ***G08B 5/22*** | (2006.01) |
| ***H04M 1/663*** | (2006.01) |
| *H04Q 1/30* | (2006.01) |

(52) U.S. Cl.

USPC .................... 340/539.11; 340/539.1; 340/7.2; 340/7.5; 340/7.31; 340/7.43; 340/7.51; 340/7.58; 340/7.6; 340/7.61; 340/7.62; 455/404.1; 455/412.1; 455/412.2; 455/567

(58) Field of Classification Search

USPC .................... 340/539.11, 7.2, 7.5, 7.51, 7.58; 455/404.1, 412.1, 412.2

See application file for complete search history.

(56) References Cited

U.S. PATENT DOCUMENTS

| | | | | |
|---|---|---|---|---|
| 5,740,532 | A * | 4/1998 | Fernandez et al. | 455/404.1 |
| 5,995,553 | A * | 11/1999 | Crandall et al. | 375/272 |
| 6,351,656 | B1 * | 2/2002 | Burgan et al. | 455/566 |
| 6,543,051 | B1 * | 4/2003 | Manson et al. | 725/33 |
| 7,616,942 | B2 | 11/2009 | Karl et al. | |
| 2007/0082711 | A1 * | 4/2007 | Zhao et al. | 455/566 |
| 2008/0085696 | A1 | 4/2008 | Salahshour et al. | |
| 2009/0298460 | A1 | 12/2009 | Ruda et al. | |

OTHER PUBLICATIONS

International Search Report; PCT/US2011/044252; Date of Mailing Dec. 6, 2011; 2 pages.

Written Opinion of the International Searching Authority; PCT/US2011/044252; Date of Mailing Dec. 6, 2011; 11 pages.

* cited by examiner

*Primary Examiner* — Donnie Crosland
(74) *Attorney, Agent, or Firm* — Ulmer & Berne LLP

(57) ABSTRACT

An electronic alert apparatus comprises a radio frequency receiver configured to receive and identify an emergency message preamble that indicates an impending transmission of an emergency message sent at a first data rate and an emergency message addressed to a shared device address sent at a second data rate. The electronic alert apparatus also includes a processor operatively connected to the radio frequency receiver and configured to decode the encoded emergency message. A memory is operatively connected to the processor and configured to store the decoded emergency message. A display is operatively connected to the controller and configured to present the decoded emergency message. A power source is configured to supply electrical power to the processor, and a housing is configured to at least partially enclose the processor, the memory, and the power source.

75 Claims, 12 Drawing Sheets

ELECTRONIC EMERGENCY MESSAGING SYSTEM

TECHNICAL FIELD

The systems and methods disclosed and described in this document relate generally to the field of wireless electronic communications. Specifically, those systems and methods relate to the field of electronic emergency communications and notifications.

SUMMARY

Figure 1:
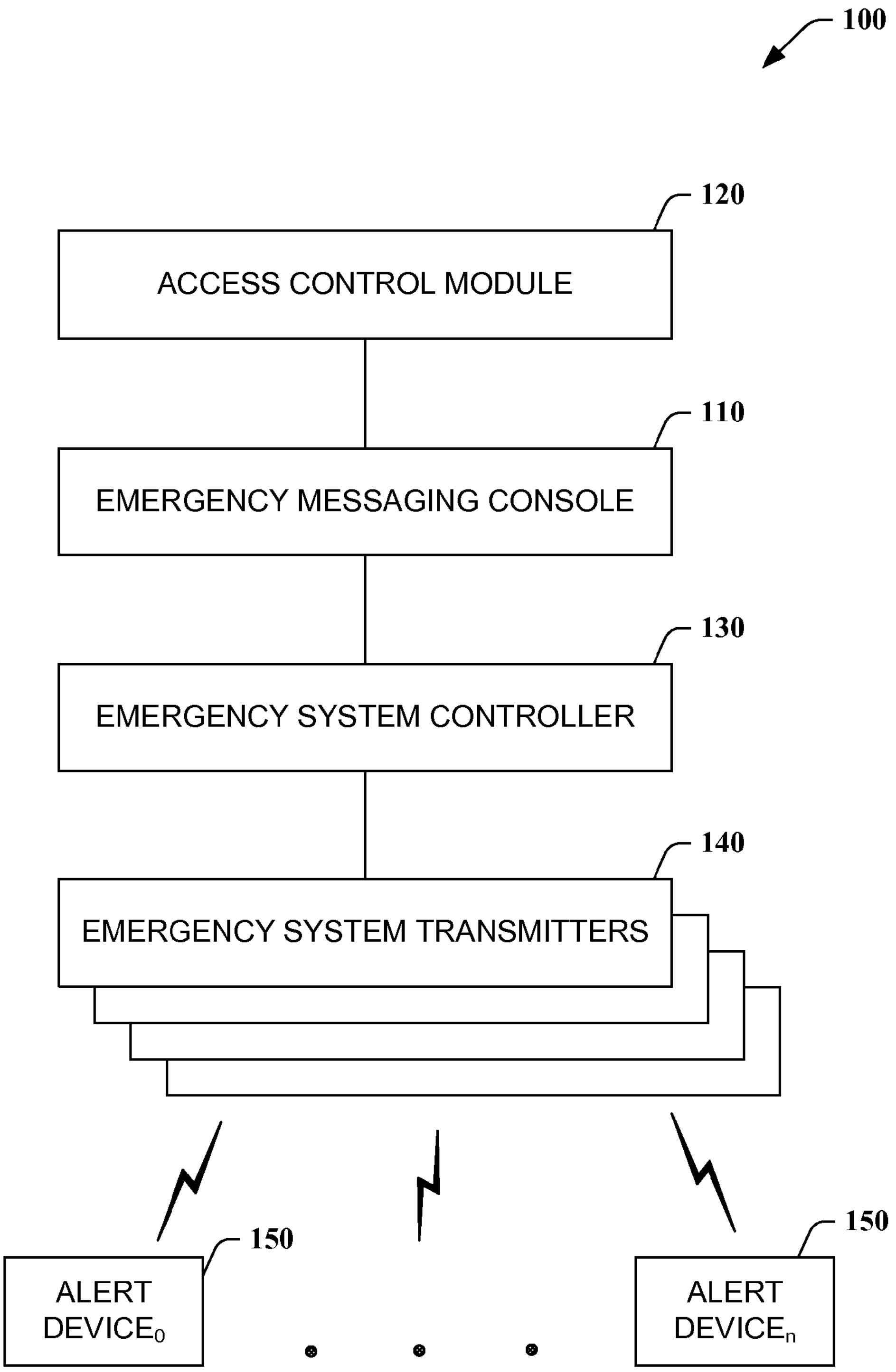
FIG. 1 is a system block diagram of an emergency messaging system.

An electronic alert apparatus can comprise a radio frequency receiver configured to receive, at a first data rate, and identify an emergency message preamble that indicates an impending transmission at a second data rate of an encoded emergency message to a shared device address, and receive, at a second data rate, the encoded emergency message; a processor operatively connected to the radio frequency receiver and configured to decode the encoded emergency message to create a decoded emergency message; a memory operatively connected to the processor and configured to store the decoded emergency message; a display operatively connected to the controller and configured to present the decoded emergency message; a power source configured to supply electrical power to the processor, and a housing configured to at least partially enclose the processor, the memory, and the power source.

The electronic alert apparatus can include a display that includes a backlight that is configured to be selectively activated by the processor. It can further comprise a transducer operatively connected to the processor and configured to emit an audible alert to indicate receipt of the encoded emergency message as well as a vibrator operatively connected to the processor and configured to vibrate to indicate receipt of the encoded emergency message. Additionally, the electronic alert apparatus can further comprise an alert light operatively connected to the processor and configured to activate to indicate receipt of the encoded emergency message. The electronic alert apparatus can further comprise a voice synthesizer configured to emit a warning in a human-understandable language. Also, the housing can be further configured to permit attachment to a retaining ring. The retaining ring can be a keyring.

The encoded emergency message can be encrypted. The electronic alert apparatus can further comprise a clock operatively connected to the processor and configured to maintain a date and time reference, and wherein the processor is further configured to calculate a value from the date and time reference and use the value to decrypt the encoded emergency message. The display can include a backlight that is configured to be operable by the processor. The electronic alert apparatus can further comprise a transducer operatively connected to the processor and configured to emit an audible alert to indicate receipt of the encoded emergency message and a vibrator operatively connected to the processor and configured to vibrate to indicate receipt of the encoded emergency message. Additionally, an alert light can be operatively connected to the processor and configured to activate to indicate receipt of the encoded emergency message. Further, the electronic alert apparatus can comprise a voice synthesizer configured to emit a warning in a human-understandable language. The housing can be further configured to permit attachment to a retaining ring and the retaining ring can be a keyring.

The electronic alert apparatus can further comprise a power management circuit operatively connected to the processor and configured to switch the processor from a storage mode to an active mode and a display that includes a backlight that is configured to be operable by the processor as well as a transducer operatively connected to the processor and configured to emit an audible alert to indicate receipt of the encoded emergency message and a vibrator operatively connected to the processor and configured to vibrate to indicate receipt of the encoded emergency message. The electronic alert apparatus can further comprise an alert light operatively connected to the processor and configured to activate to indicate receipt of the encoded emergency message. Also, the electronic alert apparatus can comprise a voice synthesizer configured to emit a warning in a human-understandable language. The electronic alert apparatus can include a housing configured to permit attachment to a retaining ring and the retaining ring can be a keyring.

A method for obtaining alert messages can comprise the steps of receiving, at a first data rate, a message preamble, identifying the message preamble as an emergency preamble that indicates impending transmission, at a second data rate, an encoded emergency message to a shared device address; receiving, at a second data rate, the encoded emergency message; decoding the encoded emergency message; storing the decoded message in a memory; and presenting the decoded message on a display. The method can further comprise the step of emitting an audible alert to indicate receipt of the encoded emergency message. The method can also further comprise the step of activating a vibrator to indicate receipt of the encoded emergency message. The step of activating a light to indicate receipt of the encoded emergency message can be included. The encoded emergency message can be encrypted and the step of decrypting the encoded emergency message can be performed. The method can further comprise the step of emitting an audible alert to indicate receipt of the encoded emergency message and the audible alert can be an alert selected from the group consisting of a synthesized voice and a recorded voice. The method also can further comprise the step of activating a vibrator to indicate receipt of the encoded emergency message. The step of activating a light to indicate receipt of the encoded emergency message can also be performed.

An electronic alert apparatus can comprise means for receiving radio frequency transmissions configured to receive, at a first data rate, and identify an emergency message preamble that indicates an impending transmission, at a second data rate, of an encoded emergency message to a shared device address, and receive, at a second data rate, the encoded emergency message; a processor operatively connected to the radio frequency receiver and configured to decode the encoded emergency message to create a decoded emergency message; a memory operatively connected to the processor and configured to store the decoded emergency message; a display operatively connected to the controller and configured to present the decoded emergency message; a power source configured to supply electrical power to the processor, and a housing configured to at least partially enclose the processor, the memory, and the power source. The display can include a backlight that is configured to be operable by the processor. The electronic alert apparatus can further comprise means for emitting an audible alert operatively connected to the processor. Also, the electronic alert apparatus can further comprise a vibrator operatively connected to the processor and configured to vibrate to indicate receipt of the encoded emergency message. An alert light operatively connected to the processor and configured to activate to indicate receipt of the encoded emergency message can be included in the electronic alert apparatus. The housing can be further configured to permit attachment to a retaining ring and the retaining ring can be a keyring. The encoded emergency message can be encrypted.

The electronic alert apparatus can further comprise a clock operatively connected to the processor and configured to maintain a date and time reference and wherein the processor is further configured to calculate a value from the date and time reference and use the value to decrypt the encoded emergency message. The display can include a backlight that is configured to be operable by the processor. The electronic alert apparatus can further comprise a transducer operatively connected to the processor and configured to emit an audible alert to indicate receipt of the encoded emergency message. A vibrator can be operatively connected to the processor and configured to vibrate to indicate receipt of the encoded emergency message. An alert light can be operatively connected to the processor and configured to light to indicate receipt of the encoded emergency message. The housing can be further configured to permit attachment to a retaining ring and the retaining ring can be a keyring.

The electronic alert apparatus can further comprise a power management circuit operatively connected to the processor and configured to switch the processor from a storage mode to an active mode. The display can include a backlight that is configured to be operable by the processor. The electronic alert apparatus can further comprise means for emitting an audible alert operatively connected to the processor. Also, the electronic alert apparatus can further comprise a vibrator operatively connected to the processor and configured to vibrate to indicate receipt of the encoded emergency message. An alert light can be operatively connected to the processor and configured to light to indicate receipt of the encoded emergency message. The housing can be further configured to permit attachment to a retaining ring and the retaining ring can be a keyring.

An emergency messaging system can comprise an operator interface configured to accept entry of an emergency message; an encoding module configured to create an emergency preamble configured to indicate an impending transmission of the emergency message; and encode the emergency message according to a predetermined messaging protocol to create an encoded message; an addressing module configured to associate the encoded message with a shared device identifier; and a transmission module configured to cause the emergency preamble to be broadcast at a first data rate, and cause the emergency message to be broadcast with the shared device identifier at a second data rate.

The emergency messaging system can further comprise an access control module operatively connected to the operator interface and configured to selectively permit access to the emergency messaging system to a previously authorized operator. The access control module can be one of a token-based authentication system, username-password authentication system, a biometric authentication system, and a multi-factor authentication system. The emergency messaging system can further comprise an encryption module configured to encrypt at least one of the emergency message and the encoded message prior to broadcast. The encryption module can be configured to apply at least one of a private key algorithm, a public key algorithm, a symmetric key algorithm, an asymmetric key algorithm, a one-time pad algorithm, an elliptic curve algorithm, and a quantum encryption algorithm. The operator interface can include a message selection module configured to permit selection of a message as the emergency message from among a set of prepared messages. The emergency messaging system can further comprise a transmitter configured to receive the emergency message and to broadcast the emergency message and the transmitter can be further configured to activate an audible alert associated with the emergency message. The audible alert can be an alert selected from the group consisting of a synthesized voice and a recorded voice.

The emergency messaging system can further comprise an access control module operatively connected to the operator interface and configured to selectively permit access to the emergency messaging system to a previously authorized operator. The access control module can be one of a token-based authentication system, username-password authentication system, a biometric authentication system, and a multi-factor authentication system. The emergency messaging system can further comprise an encryption module configured to encrypt at least one of the emergency message and the encoded message prior to broadcast. The encryption module can be configured to apply at least one of a private key algorithm, a public key algorithm, a symmetric key algorithm, an asymmetric key algorithm, a one-time pad algorithm, an elliptic curve algorithm, and a quantum encryption algorithm. The operator interface can include a message selection module configured to permit selection of a message as the emergency message from among a set of prepared messages.

A method for distributing an emergency message can comprising the steps of accepting an emergency message entered at an operator interface; creating an encoded message by encoding the emergency message according to a predetermined messaging protocol; creating an addressed message by addressing the encoded message with a shared device identifier; instructing a transmitter to broadcast an emergency preamble that is configured to indicate an impending transmission of the emergency message at a first data rate; and instructing a transmitter to broadcast the addressed message at a second data rate. The method for distributing an emergency message can further comprise the step of selectively permitting access to the operator interface to a previously authorized operator. The step of encrypting at least one of the emergency message, the encoded message, and the addressed message can also be performed.

The step of accepting an emergency message can include the step of selecting a message from among a set of prepared messages for use as the emergency message. The method for distributing an emergency message can further comprise the step of broadcasting the addressed message. The method can also further comprise the step of activating an audible alert associated with the addressed message. The step of emitting the audible alert can be performed. The audible alert can be an alert selected from the group consisting of a synthesized voice and a recorded voice.

DETAILED DESCRIPTION

Emergency notification systems can include the use of wireless data transmissions such as data transmissions using radio frequency transmissions. The devices, methods, and systems disclosed and described in this document can be used to notify users of electronic messaging equipment of emergencies and to provide information, such as response instructions, related to that emergency. For ease of description, the examples included in this document focus on an electronic paging device. Those of ordinary skill in this art area will recognize from reading this description that the devices, methods, and systems described can be applied to, or easily modified for use with, other types of equipment. Like reference numerals are intended to refer to the same or similar components.

Throughout this disclosure, references to components or modules generally refer to items that logically can be grouped together to perform a function or group of related functions. Components and modules can be implemented in software, hardware, or a combination of software and hardware. The term software is used expansively to include not only executable code, but also data structures, data stores and computing instructions in any electronic format, firmware, and embedded software. It should be noted that although examples discussed below might describe specific features or functions as part of a specific component or module, those features or functions may be implemented as part of a different component or module.

The examples discussed below are examples only and are provided to assist in the explanation of the systems and methods described. None of the features or components shown in the drawings or discussed below should be taken as mandatory for any specific implementation of any of these systems or methods unless specifically designated as mandatory. For ease of reading and clarity, certain components, modules, or methods, may be described solely in connection with a specific figure. Any failure to specifically describe a combination or subcombination of components should not be understood as an indication that any combination or subcombination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented may be performed in a different order or in parallel.

FIG. 1 is a system block diagram of an emergency messaging system 100. The emergency messaging system 100 can be used to broadcast messages to recipients during an emergency. For example, during a significant event such as a terrorist attack, natural disaster, or law enforcement or other emergency, public safety officials might need or want to communicate response instructions or other information to members of an affected group or community. The emergency messaging system 100 can be used for these types of communications, among others.

The emergency messaging system 100 can include an emergency messaging system console 110. The emergency messaging system console 110 can serve as an interface between a human operator of the emergency messaging system 100 and the emergency messaging system 100 itself. In this example, the emergency messaging console 110 can serve as the primary data input and control facility of the emergency messaging system 100.

The emergency messaging system console 110 can be implemented as a software program running on a general purpose computer that has appropriate data connections to other parts of the emergency messaging system 100. Additionally or alternatively, the emergency messaging system console 110 can be constructed as a special-purpose or dedicated component to enable access by an operator. An appropriate human-computer interface, such as a graphical user interface ("GUI") can be employed to aid a human operator using the emergency messaging system 100. Another type of human-computer interface, such as a command line interface, a text-based interface, a menu-driven interface, a voice-command system, or a Braille interface can be used as an alternative or supplementary interface, as appropriate or desired.

An operator can use the emergency messaging system console 110 to enter a message to be broadcast to recipients during an emergency situation, for example, by typing a message into a text field. Additionally or alternatively, the human-computer interface provided by the emergency messaging system console 110 can permit selection of a previously prepared message from among a group of prepared messages. Details of how such messages can be selected depend upon the type of human-computer interface used.

A map-based interface can be used as part of the emergency messaging system console 110. A map-based interface can permit an operator of the emergency messaging system 100 to visualize placement of various receivers as well as a geographic area within which the emergency messaging system 100 can operate. The map-based interface can permit a user to geo-target areas to be alerted. Examples of geographic areas that can be visualized using a map-based system include academic or corporate campuses; office buildings; shopping malls or complexes; office, industrial, commercial, or other complexes; industrial parks; municipalities; counties; regions of a country, or an entire country; among others.

Access to the emergency messaging console 110, and thereby to the entire emergency messaging system 100, can be controlled by an access control module 120. The access control module 120 can be used to limit access to authorized operators (not shown). These authorized operators can be members of an emergency response agency or others who have been approved to access the emergency messaging system 100. The access control module 120 can be implemented in variety of ways, including as one of a variety of challenge-response systems or personal identification systems. Specifically, the access control module 120 can be a username-password system, a token-based identification system, a two-factor or multi-factor authentication system, a biometric authentication system such as a fingerprint or retina scanner, or another appropriate authentication system.

The emergency messaging console 110 can access an emergency system controller 130. The emergency system controller 130 can accept an emergency message input by an operator of the emergency messaging console 110. The emergency message can be formatted for broadcast by the emergency system controller 130. Formatting of the emergency message can include encryption of the message using a suitable encryption algorithm.

The emergency system controller 130 can send the formatted emergency message to one or more emergency system transmitters 140. The emergency system transmitters 140 can be based upon standard wireless paging transmitters, modified as described below. Among those modifications are transmissions of message preambles at a first data rate and transmission of an emergency message at a second data rate. Another possible modification is transmission of a message preamble on a first radio frequency and transmission of an emergency message on a second radio frequency. Various combinations of these approaches are also possible.

One or more alert devices 150 can receive an emergency message wirelessly broadcast from at least one of the emergency system transmitters 140. Each alert device 150 can be implemented as a wireless messaging unit or pager, modified as described below. Among the modifications made is the inclusion of an address that is common to all receivers in a group. This address can be implemented as a channel address protocol ("CAP") code that is associated with emergency message broadcasts or another suitable addressing scheme can be used. Each of the alert devices 150 can receive and decode messages broadcast to devices using that common address. Different groups of alert devices 150 can be created through the use of different addresses. More complex groupings and overlapping groupings can be created by using multiple addresses in each of the alert devices 150. Additionally or alternatively, more complex addressing can be accomplished by including a group address in the emergency text message. This address can be identified by the alert devices 150 but can be stripped from a message delivered to a readable display (not shown).

Figure 2A:
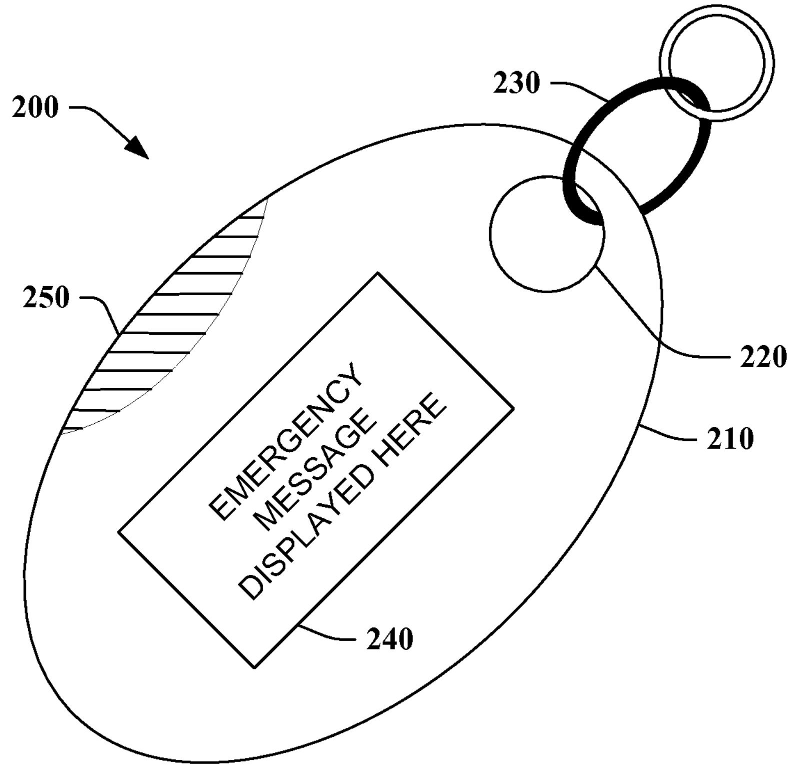
FIG. 2A is a plan view of a front side of a keychain emergency messaging device.

FIG. 2A is a plan view of a front side of a keychain emergency messaging device 200. The keychain emergency messaging device 200 can be used as the alert device 150 described above in conjunction with FIG. 1. Additionally or alternatively, other types of messaging devices and wireless communication devices can be used as the alert device 150 of FIG. 1.

The keychain emergency messaging device 200 can include a housing 210. The housing 210 can be shaped into a suitable form factor and constructed from a durable material to protect other components of the keychain emergency messaging device 200. Among the materials that can be used to create the housing 210 are various plastics such as polyethylene, polystyrene, and polycarbonate, among others. Other suitable materials may also be used.

An opening 220 can be formed in the housing 210 to permit one or more rings 230 to be connected to the housing 210. The rings 230 can be used to connect the keychain emergency messaging device 200 to a keychain, a lanyard, a backpack, or other appropriate apparatus. In addition to or instead of the rings 230, another type of attachment device can be used to connect the keychain emergency messaging device 200 to some item so that the keychain emergency messaging device 200 can be carried conveniently.

A display 240 can be positioned so that it is visible through the front of the housing 210. In this example, the display 240 can be a liquid crystal display that can present a message on its screen. As shown, the display 240 can show up to three lines of text with each line including up to eighteen characters. The display 240 can be used to scroll longer messages. The display 240 can include a backlight (not shown) to assist in ease of reading. The backlight can be activated upon receipt of an emergency message and changed or deactivated after some period of time to indicate age of a message, to conserve power, upon passage of an emergency situation, or to indicate some other property.

An alert light 250 can activate to visually indicate that an emergency message has been received by the keychain emergency messaging device 200. As shown, the alert light 250 can be a light emitting diode ("LED") positioned behind a protective window of the housing 210. The LED can be a single color or a multicolor LED. The protective window can be transparent or translucent and can be colored or clear. Upon activation, the alert light 250 can operate in various modes, including burning steadily, flashing according to some sequence, changing colors (if multicolor capabilities are present), or some combination of these modes. As with the backlight of the display 240, the alert light 250 can be changed or deactivated after some period of time to indicate age of a message, to conserve power, upon passage of an emergency situation, or to indicate some other property.

Figure 2B:
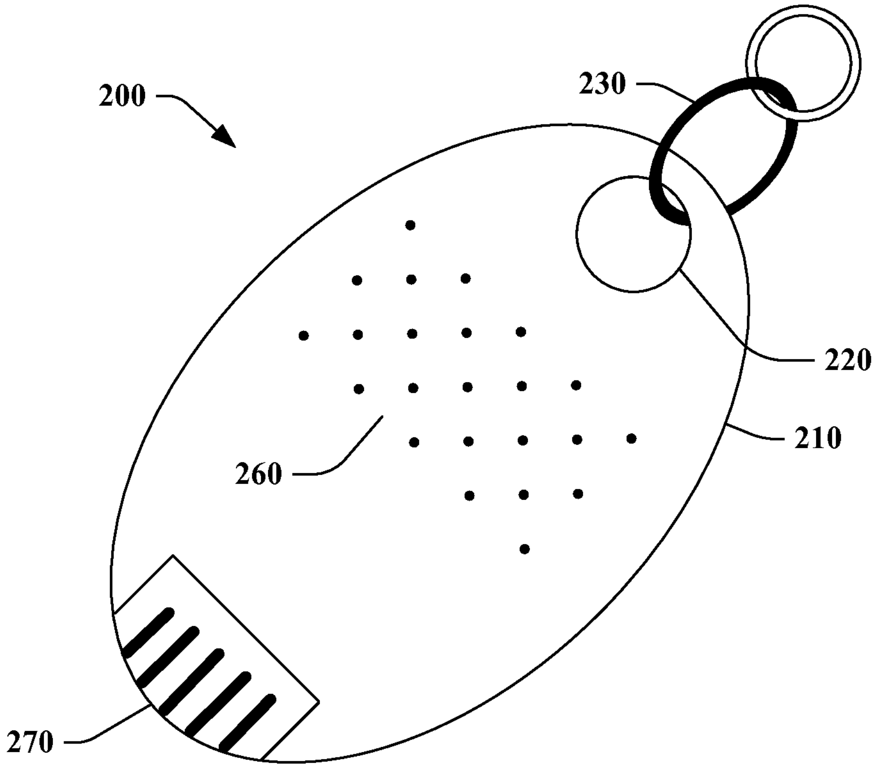
FIG. 2B is a plan view of a back side of a keychain emergency messaging device.

FIG. 2B is a plan view of a back side of the keychain emergency messaging device 200. A group of apertures 260 provides one or more acoustic pathways so that an audible alert can be emitted by the keychain emergency messaging device 200. The apertures 260 permit sound to be emitted while the housing 210 remains intact to protect a speaker, a transducer, or other sound-emitting device (not shown). Upon activation, an audible alert can be emitted and can sound in various modes, including a steady tone, periodic beeping or chirping according to some sequence, changing tones (if multitone capabilities are present), or some combination of these modes. Additionally or alternatively, the audible alert can be speech produced by a text-to-speech unit (not shown) or voice synthesizer. As with the backlight of the display 240 and the alert light 250, an audible alert can be changed or deactivated after some period of time to indicate age of a message, to conserve power, upon passage of an emergency situation, or to indicate some other property.

A programming port 270 can provide a data link to permit the keychain emergency messaging device 200 to be programmed. The programming port 270 can be protected with a cover (not shown) or can be positioned within the housing 210 for grater protection and to hide the programming port 270 from view. The programming port 270 can be a barrel type, pin type, micro-universal serial bus ("micro-USB"), or another appropriate port type in addition to or as an alternative to the tabbed configuration shown as the programming port 270.

Figure 3A:
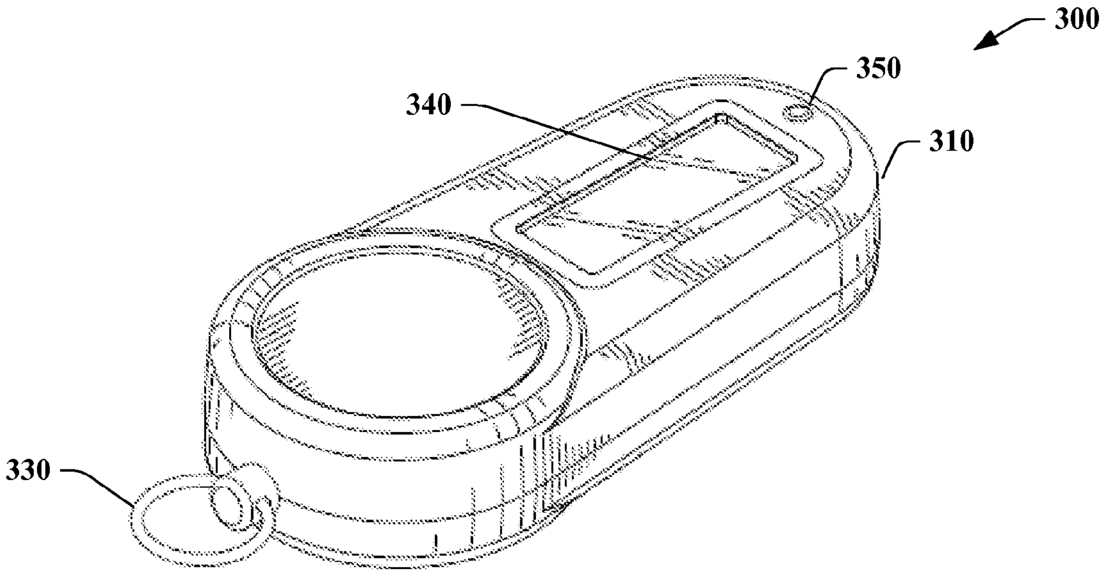
FIG. 3A is a perspective view of a front side of another keychain emergency messaging device.
Figure 3B:
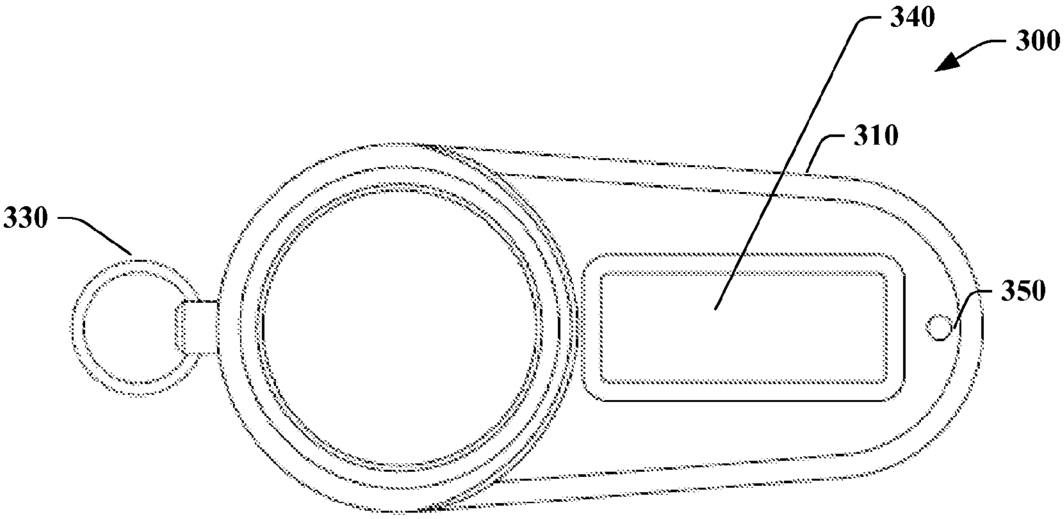
FIG. 3B is a plan view of a front side of another keychain emergency messaging device.

FIG. 3A is a perspective view of another keychain emergency messaging device 300. FIG. 3B is a plan view of another keychain emergency messaging device. The keychain emergency messaging device 300 can be used as the alert device 150 described above in conjunction with FIG. 1 or the alert device 200 described above in conjunction with FIGS. 2A and 2B and illustrates one possible form factor that can be used when implementing these devices. Additionally or alternatively, other types of messaging devices and wireless communication devices can be used as the alert device 150 of FIG. 1.

The keychain emergency messaging device 300 can include a housing 310. The housing 310 can be shaped into a suitable form factor and constructed from a durable material to protect other components of the keychain emergency messaging device 300. Among the materials that can be used to create the housing 310 are various plastics such as polyethylene, polystyrene, and polycarbonate, among others. Other suitable materials may also be used.

A ring assembly 330 can be connected to the housing 310. The ring assembly 330 can be used to connect the keychain emergency messaging device 300 to a keychain, a lanyard, a backpack, or other appropriate apparatus. In addition to or instead of the ring assembly 330, another type of attachment device can be used to connect the keychain emergency messaging device 300 to some item so that the keychain emergency messaging device 300 can be carried conveniently.

A display 340 can be positioned so that it is visible through the front of the housing 310. In this example, the display 340 can be a liquid crystal display that can present a message on its screen. As shown, the display 340 can show up to three lines of text with each line including up to eighteen characters. The display 340 can be used to scroll longer messages. The display 340 can include a backlight (not shown) to assist in ease of reading. The backlight can be activated upon receipt of an emergency message and changed or deactivated after some period of time to indicate age of a message, to conserve power, upon passage of an emergency situation, or to indicate some other property.

An alert light 350 can activate to visually indicate that an emergency message has been received by the keychain emergency messaging device 300. As shown, the alert light 350 can be a light emitting diode ("LED") positioned behind a protective window of the housing 310. The LED can be a single color or a multicolor LED. The protective window can be transparent or translucent and can be colored or clear. Upon activation, the alert light 350 can operate in various modes, including burning steadily, flashing according to some sequence, changing colors (if multicolor capabilities are present), or some combination of these modes. As with the backlight of the display 340, the alert light 350 can be changed or deactivated after some period of time to indicate age of a message, to conserve power, upon passage of an emergency situation, or to indicate some other property.

Figure 4:
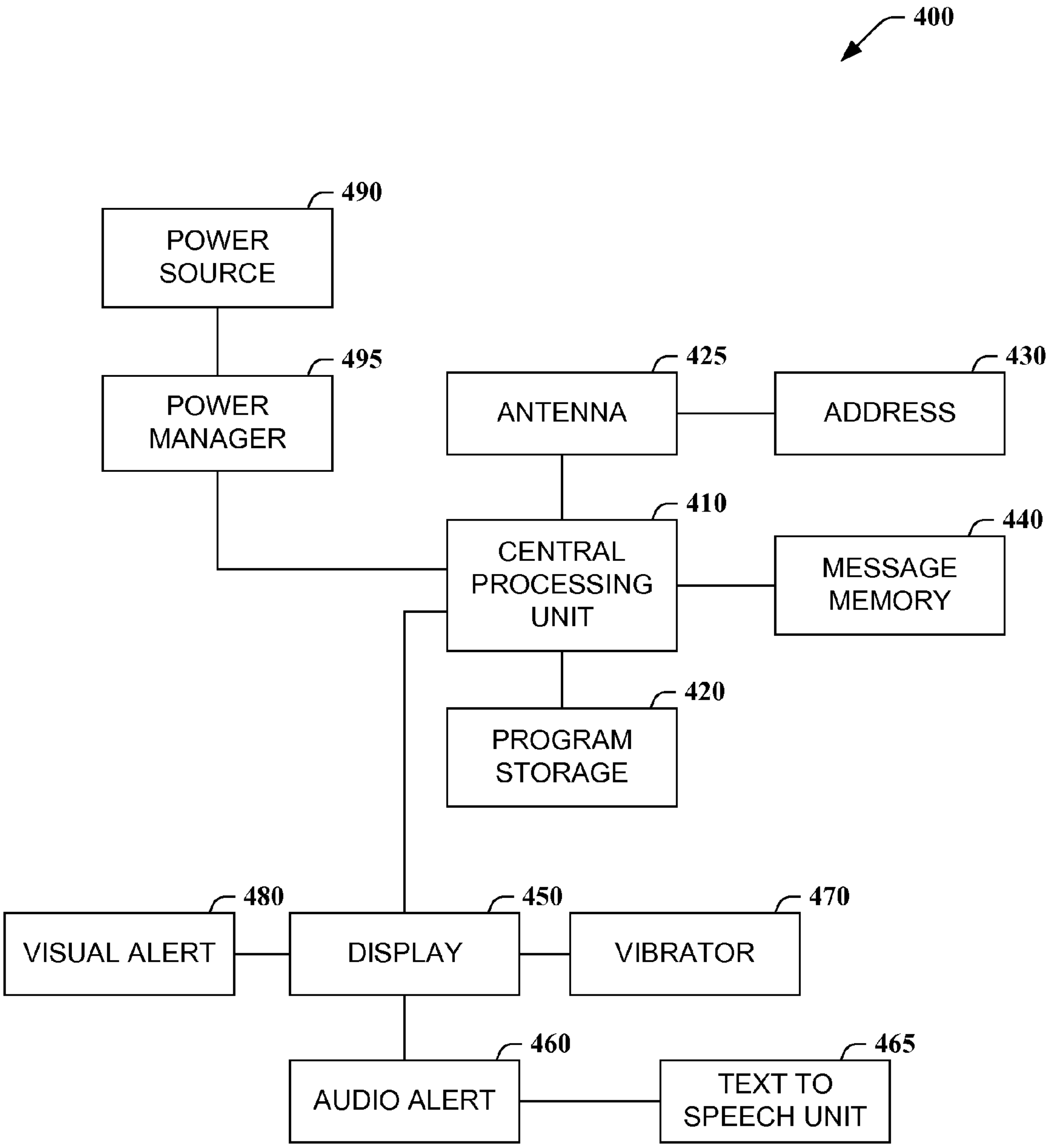
FIG. 4 is a system block diagram of an emergency messaging device.

FIG. 4 is a system block diagram of an emergency messaging device 400. The emergency messaging device 400 can be used to implement the keychain emergency messaging device 200 of FIGS. 2A and 2B or the keychain messaging device 400 of FIGS. 3A and 3B. Other messaging devices, including messaging devices with other form factors, can also be based on the emergency messaging device 400.

The emergency messaging device 400 can include a central processing unit ("CPU") 410. In this document, the terms central processing unit, CPU, and processor are used interchangeably. The CPU 410 can be connected to a program storage unit 420. The program storage unit 420 can be implemented as a non-volatile memory unit such as flash memory. Another suitable type of storage, including magnetic media, volatile memory, or optical storage, among others, can also be used as desired or appropriate for a specific implementation. The program storage unit 420 can include executable code and data instructions that the CPU 410 can use during operation of the emergency messaging device 400.

The CPU 410 can be connected to an antenna 425. The antenna 425 can receive radio frequency ("RF") transmissions of messages, including emergency messages. An address module 430 can be coupled with the antenna 425 and can select messages addressed to an address that matches one of the addresses specified for the emergency messaging device 400. Additionally or alternatively, the address module 430 can be associated with the CPU 410 or made part of programming instructions stored in the program storage unit 420. Other configurations are also possible.

A message memory 440 can be coupled with the CPU 410 and can store received messages. The message memory 440 can be implemented as volatile or non-volatile memory such as random access memory ("RAM") or flash memory, respectively. Another suitable type of memory may also be used.

The CPU 410 can access a display 450. The display 450 can be a liquid crystal display, an LED display, an organic LED ("OLED") display, or another suitable type of display capable of presenting viewable messages to a user of the emergency messaging device 400. The display 450 can also include a backlight (not shown). The display 450 can present a time of day with a flashing colon to indicate that emergency messaging device 400 is operating.

An audio alert module 460 can be controlled by the CPU 410 and can emit an audible alert. The audio alert module 460 can be a transducer, a speaker, or other suitable sound-producing device. A text-to-speech unit 465, which can be implemented as a voice synthesizer or other appropriate component, can cooperate with the audio alert module 460 to audibly output an emergency message as a reproduction or facsimile of a human voice speaking an appropriate language. A vibrator 470 can also be controlled by the CPU 410 and can be activated to provide a tactile or haptic alert. The CPU 410 can also control a visual alert module 480. The visual alert module can be an LED, incandescent bulb, strobe, or other appropriate visual indicator. Various alert modes can be configured and can correspond to messages sent to a specific address such that messages sent to differing addresses can trigger different alerts.

The CPU 410 can receive power from a power source 490. The power source 490 can be a rechargeable or nonrechargable battery, a capacitor or supercapacitor, a photovoltaic cell, or other suitable power source. Access to and use of power from the power source 490 can be managed by a power manager 495. One possible implementation of a power manager is described below in conjunction with FIG. 4.

Figure 5:
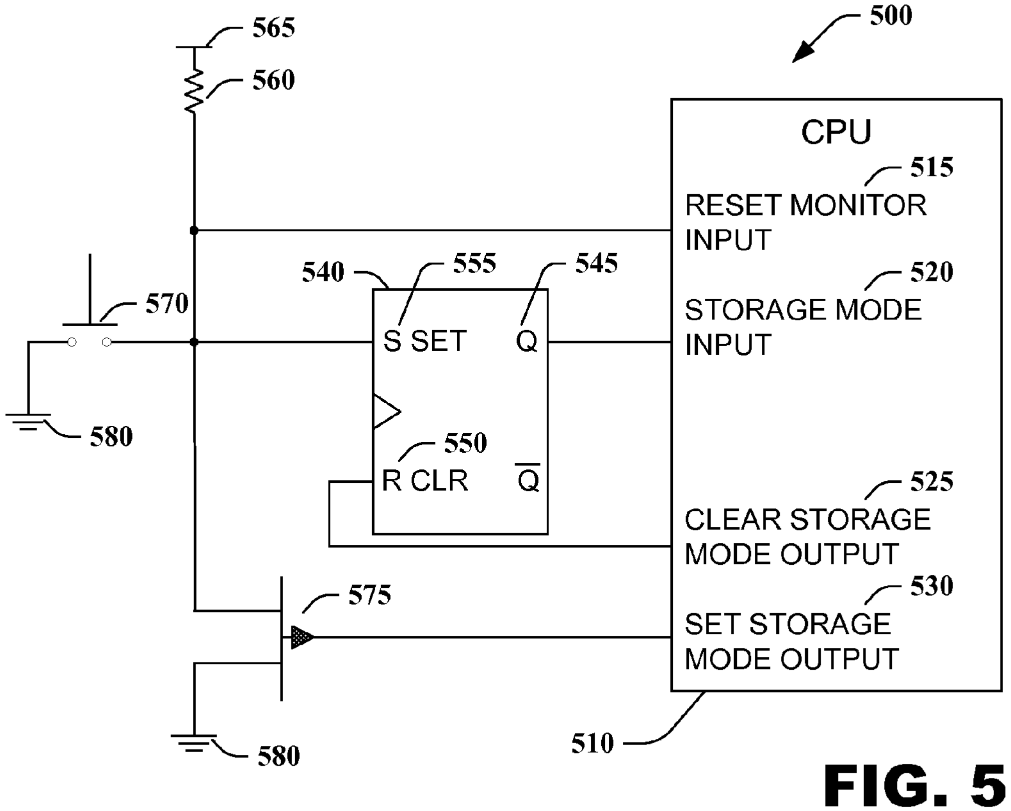
FIG. 5 is a schematic view of a power management circuit.

FIG. 5 is a schematic view of a power management circuit 500. The power management circuit 500 can be used as the power manager 495 of the emergency messaging device 400 described above in conjunction with FIG. 4. Another suitable power management circuit can also be used.

The power management circuit 500 can be used to switch an electronic device, such as the emergency messaging device 400 of FIG. 4, between a low-power consumption storage mode, and an active operation mode. This switch can be implemented as a one-time, non-reversing mode switch. In this example, the power management circuit 500 is described as part of an emergency messaging device (not shown) similar to the one described above.

The power management circuit 500 can include a processor 510. The processor 510 can monitor various ports to determine in which mode the emergency messaging device should be. The processor 510 can have a reset input 515, a storage mode input 520, a clear output 525, and a set output 530. The processor 510 can be connected to an SR flip-flop 540. An output 545 of the SR flip-flop 540 can be connected to the storage mode input 520 of the processor 510. An R input 550 of the SR flip-flop 540 can be connected to the clear output 525 of the processor 510.

An S input 555 of the SR flip-flop 540 can be electrically connected to the reset output 515 of the processor 510, to a resistor 560 which in turn can be connected to a power source 565, to a push switch 570 (shown in an open position), and to an amplifier 575. Each of the push switch 570 and the amplifier 575 can be connected to a ground 580. When used in a device such as the keychain emergency messaging device 200, the push switch 570 can be activated through use of a separate plunger. Commonly, such switches can be designed to be operated by a straightened portion of a paperclip or similarly shaped object. A reset function can be activated by closing the push switch 570 for a certain amount of time, such as about 15 seconds.

Figure 6:
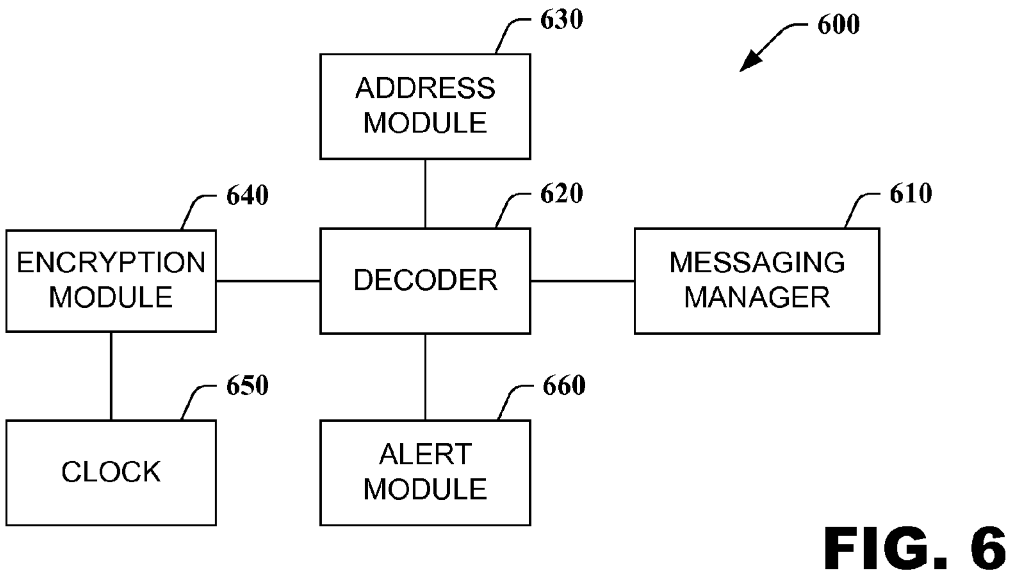
FIG. 6 is a system block diagram of an emergency message receiver.

FIG. 6 is a system block diagram of an emergency message receiver 600. The emergency message receiver 600 can be used to implement the keychain emergency messaging device 200 of FIGS. 2A and 2B. Other messaging devices, including messaging devices with other form factors, can also be based on the emergency messaging device 600.

A paging manager 610 can control basic operations of the emergency messaging device 600. A decoder 620 can communicate with an address module 630 to accept messages addressed to the emergency messaging device 600. In this example, the decoder 620 can decode messages encoded according to a synchronous paging protocol. Specifically, a modified version of the Post Office Code Standardization Advisory Group ("POCSAG") can be used.

A typical messaging device configured to decode POCSAG messages can wake to check for messages for durations ranging from the time it takes to transmit between 5 bits to 8 bits at a specified data rate during a cycle period that is approximately equal to 0.85 times the length of the message preamble at a specified data rate. Common data rates are 512, 1200, and 2400 bits per second ("bps"). Another appropriate data rate may be used. The emergency messaging device 600 of this example can support at least the data rates of 512, 1200, and 2400 bps in addition to a special emergency message indicator data rate as described elsewhere.

The standard POCSAG protocol includes a preamble. In the example modification presented here, the standard preamble can be changed to include a specially crafted data pattern. This special preamble pattern can be broadcast at a specially designated data rate for a specified time interval. The time interval can be made programmable, for example a period of between about 5 seconds and about 60 seconds. An additional 32 bits of the special preamble can be broadcast as a suffix following the broadcast made during the time period. In this example, the special preamble and additional 32 bits can be broadcast at a data rate that is different from the data rate used in a typical POCSAG transmission, such as 512, 1200, or 2400 bps.

Broadcast of the special preamble and 32 bit suffix can be followed by a modified POCSAG preamble. This modified POCSAG preamble can be changed to 32 bits from the normal 576 bits. The modified POCSAG preamble can be sent along with an emergency message at one of the standard POCSAG data rates.

A synchronization codeword can be used during transmission for purposes set out in the POCSAG protocol. In this example, the synchronization codeword can be modified by creating a codeword derived from an address and a set of function code designators. The modified codeword can be used as a protective measure from broadcast of messages that are unauthorized or inauthentic.

Emergency messages can include a date portion that can include a predetermined number of codewords. As described in this specific example, each codeword can include 20 bits and the date portion of the message can include from 2 to 255 codewords. As further protection, each codeword, or some combination of codewords, can be encrypted according to an appropriate encryption algorithm or can be left in plaintext.

One or more information codewords can be used to provide basic information about the message itself. For example, fields within the codeword or codewords can be defined to specify the number of codewords in the message, an option field for specifying messaging modes such as messaging, testing, command communication, or other modes, as well as other message integrity parameters or checksums. The information codeword or codewords can also be encrypted or left as plaintext, as desired for a specific implementation.

In operation, the emergency messaging receiver 600 can activate for a programmable time of between about 5 seconds and about 60 seconds to attempt to receive the special preamble at the special data rate. This programmable time period is selected to correspond to a similar time period of broadcast of the special preamble. The 32 bit suffix can be received by the emergency messaging receiver 600 in the event that the emergency messaging receiver 600 activates at the end of the broadcast time interval. If the emergency messaging receiver 600 receives the special preamble or suffix, the emergency messaging receiver 600 can then remain activate to receive an emergency message at another data rate. If the emergency messaging receiver 600 does not receive either the special preamble or the suffix, the emergency messaging receiver 600 can deactivate until a next activation time. Activation can occur every 10 seconds or at another appropriate interval.

An encryption module 640 can decrypt encrypted messages decoded by the decoder 620. Any suitable encryption system can be used, including private key systems, public key systems, symmetric key systems, asymmetric key systems, elliptic curve systems, and others. Specifically, ciphers based on the advanced encryption standard ("AES"), the data encryption standard ("DES"), triple-DES ("3-DES"), Rivest-Shamir-Adelman ("RSA"), RC4, Twofish, Blowfish, and Skipjack, among, others, may be used.

In the example presented here, a private symmetric key algorithm is used by the encryption module 640. Many such algorithms are available for use. Typically, details of the algorithm itself can be both well-known and widely available. Such algorithms usually depend upon both secrecy of the key used and key length for security. The key used in this example can be derived from a value obtained from a clock 650. The clock 650 of the emergency messaging device 600 can be synchronized with a clock of the system that created and encoded the message prior to transmission to the emergency messaging device 600. Encryption components at both the sending and receiving ends of the messaging path can each access a synchronized clock, such as the clock 650, and use a common algorithm (or a matched algorithm for asymmetric encryption systems) to derive an appropriate key from the clock. It should be noted that depending on the specific key generation algorithm employed, clocks will need to be synchronized to varying degrees of precision.

An alert module 660 can notify a user of the emergency messaging device 600 that an emergency message has been received. An audible alert such as a beep or tone, a visual alert such as a flashing light, and a tactile alert such as a vibration can each be activated by the alert module 660. The alert module 660 can also activate a display that can present an on-screen message to a user.

Figure 7:
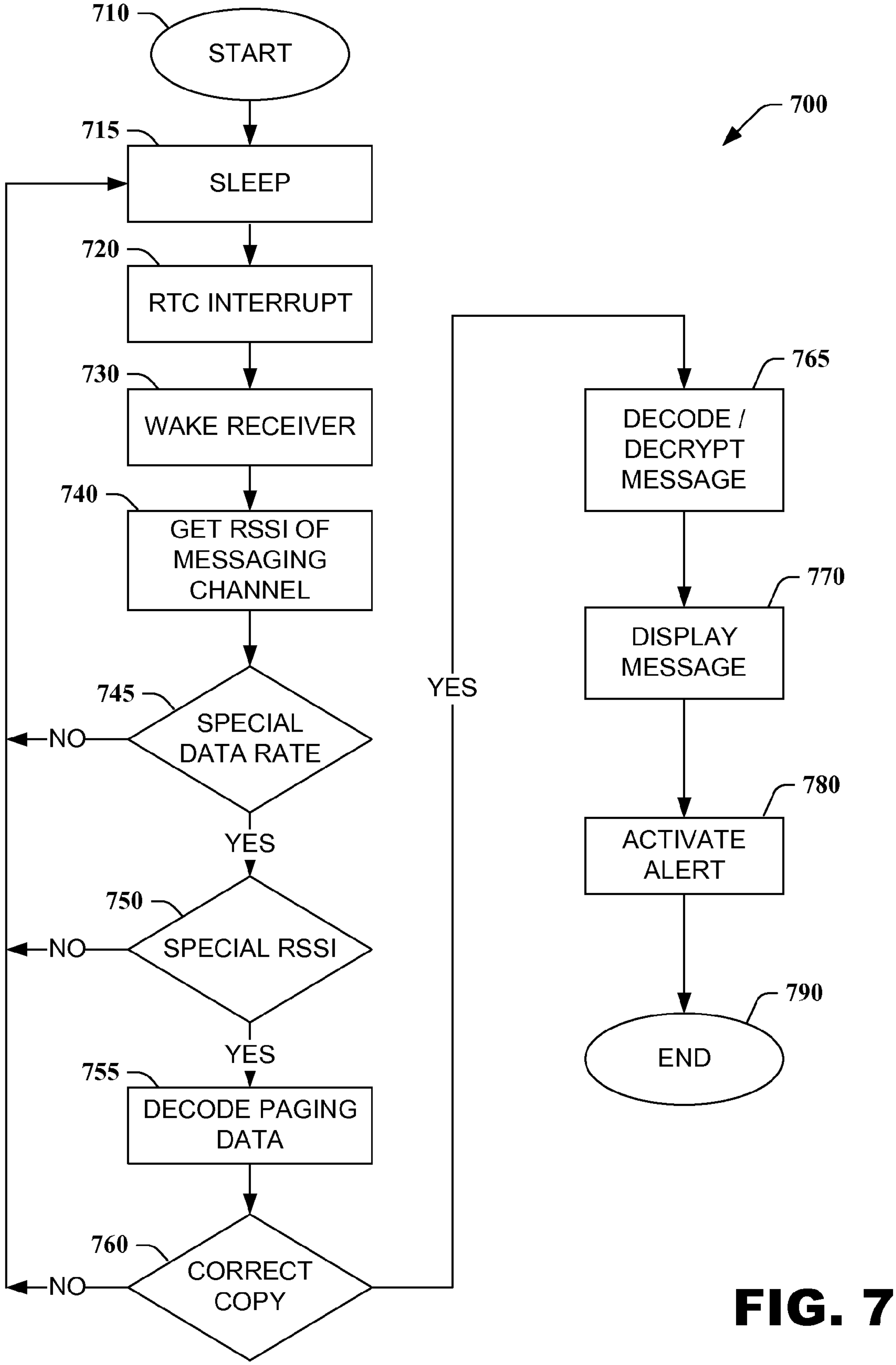
FIG. 7 is a flow diagram depicting operational steps of an emergency message receiver.

FIG. 7 is a flow diagram depicting a method of operating an emergency message receiver 700. Execution of the method begins at START block 710. At process block 715, the emergency message receiver is in a sleep mode. Processing continues to process block 720 where a real time clock ("RTC") interrupt signal is generated. At process block 730 a receiver wakes from a sleep mode upon receiving the RTC interrupt signal. Processing continues at process block 740 where a radio signal strength indication ("RSSI") of the paging channel is obtained.

At decision block 745, a determination is made whether a signal that was broadcast at a special data rate is being received. If that determination is YES, processing continues to decision block 750. There, a determination is made whether the signal at the special data rate is also a special RSSI. If that determination is YES, processing continues to process block 755.

At process block 755, paging data is decoded. Processing continues at decision block 760 where a determination is made whether the decoded data is a correct copy. If any of the determinations made at decision blocks 745, 750, or 760 are NO, processing returns to process block 715 where the device reenters sleep mode. If the determination made at decision block 760 is YES, processing continues at process block 765 where the copy of the message is decoded and decrypted. At process block 770, the decoded and decrypted message is presented on a display. Processing continues to process block 780 where one or more alerts such as audio, visual, and vibratory alerts are activated. Processing then terminates at END block 790.

Figure 8:
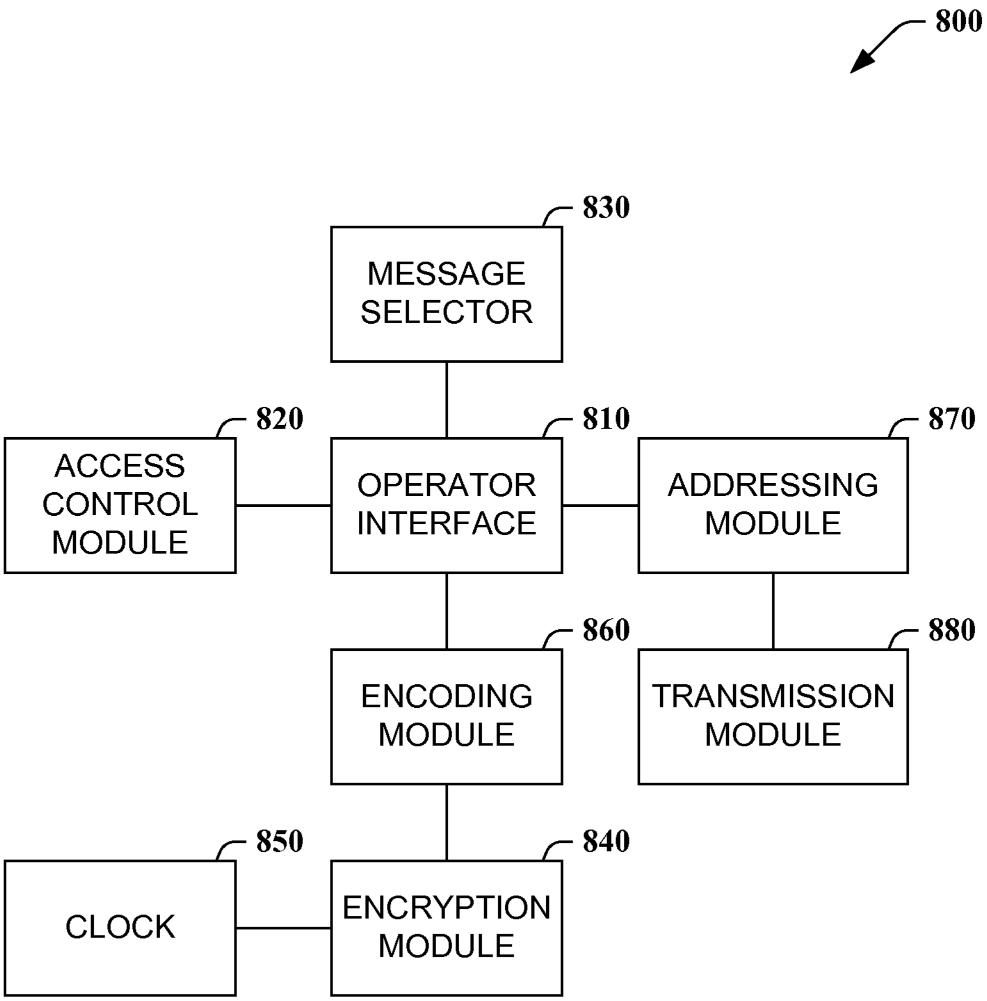
FIG. 8 is a system block diagram of an emergency messaging console.

FIG. 8 is a system block diagram of an emergency messaging console 800. The emergency messaging console 800 can be used to create and send emergency messages to one or more wireless receivers. Specifically, the emergency messaging console 800 can be used to implement the emergency messaging console 110 discussed above in conjunction with FIG. 1.

An operator interface 810 can serve as a human-computer interface to permit a human operator to enter and send messages. As with other human-computer interfaces discussed elsewhere, the operator interface 810 can be implemented as a GUI or another suitable interface and can accept messages created by a user (human or machine) of the emergency messaging console 800.

An access control module 820 can selectively control access to the operator interface 810, and in this example, to the emergency messaging console 800, by permitting or denying access to a user based at least in part upon whether the user has sufficient access rights. The access control module 820 can be implemented as a challenge-response system that can require a user to provide some form of access credentials before being permitted to use the operator interface 810. Among those systems that can be used as the access control module 820 are a username-password system, a token-based identification system, a two-factor or multi-factor authentication system, a biometric authentication system such as a fingerprint or retina scanner, or another appropriate authentication system.

A message selector 830 can provide a user with a set of messages to select for transmission. Details of how such messages are created, stored, and selected depend in part on implementation details of the operator interface 810. When a GUI is used as the operator interface 810, an operator can select a message through use of a drop-down menu, through selection of a message item in a list, or some other appropriate mechanism.

A selected message can be encrypted by an encryption module 840. The encryption module can support a number of encryption algorithms or systems, including any or all of the encryption systems previously described. In this example, as with a previous example, the encryption module 840 can access a clock 850. The encryption module 840 can derive a private key from information obtained from the clock 850 and can use that key, along with an appropriate encryption algorithm or cipher to encrypt the selected message to create an encrypted message or ciphertext. In this specific example, the clock 850 can be synchronized with at least one clock in a device acting as a receiver of emergency messages An encoding module 860 can accept the encrypted message and encode it according to a suitable protocol. In this example, a modified version of the POCSAG protocol can be used.

An addressing module 870 can accept the encoded message and address it for transmission. In this example, the encoded message can be addressed with an address that is common to a set of emergency receivers to create an addressed message. Addressing in this manner can permit near simultaneous reception of a single broadcast message by receivers programmed with the common address. A transmission module 880 can accept the addressed message and transmit the addressed message over a radio frequency transmitter.

Figure 9:
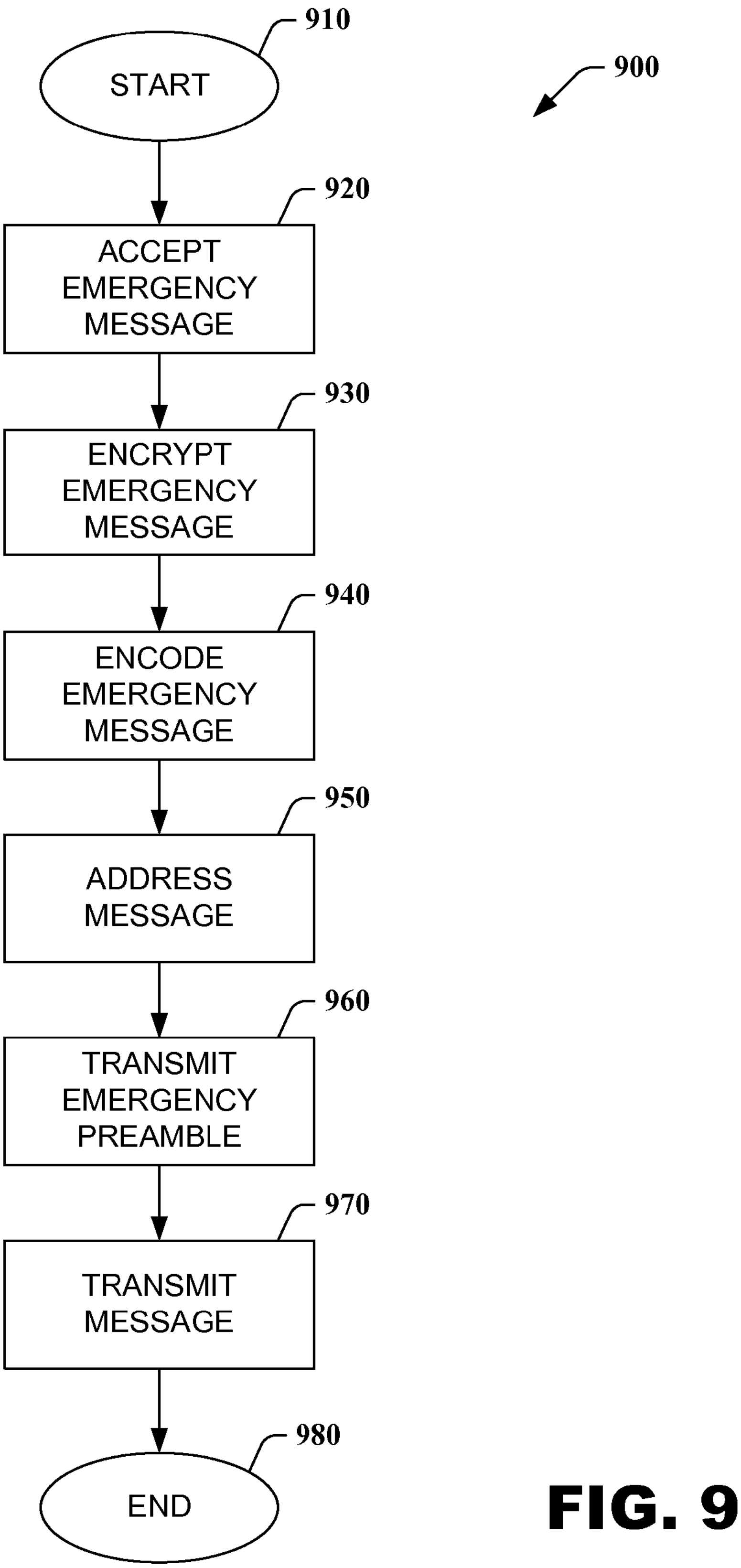
FIG. 9 is a flow diagram depicting operational steps of an emergency messaging console.

FIG. 9 is a flow diagram depicting operational steps in a process of operating an emergency messaging console 900. Processing begins at START block 910 and continues to process block 920 where an emergency message is accepted by the console. Processing continues at process block 930 where the accepted message is encrypted according to a chosen algorithm. The encrypted message is encoded in accordance with a chosen protocol to create an encoded message at process block 940.

At process block 950, the encoded message is addressed with an address for a receiving device to create an addressed message. Processing continues to process block 960 where an emergency message preamble is transmitted. The addressed message is transmitted at process block 970. Processing terminates at END block 980.

Figure 10:
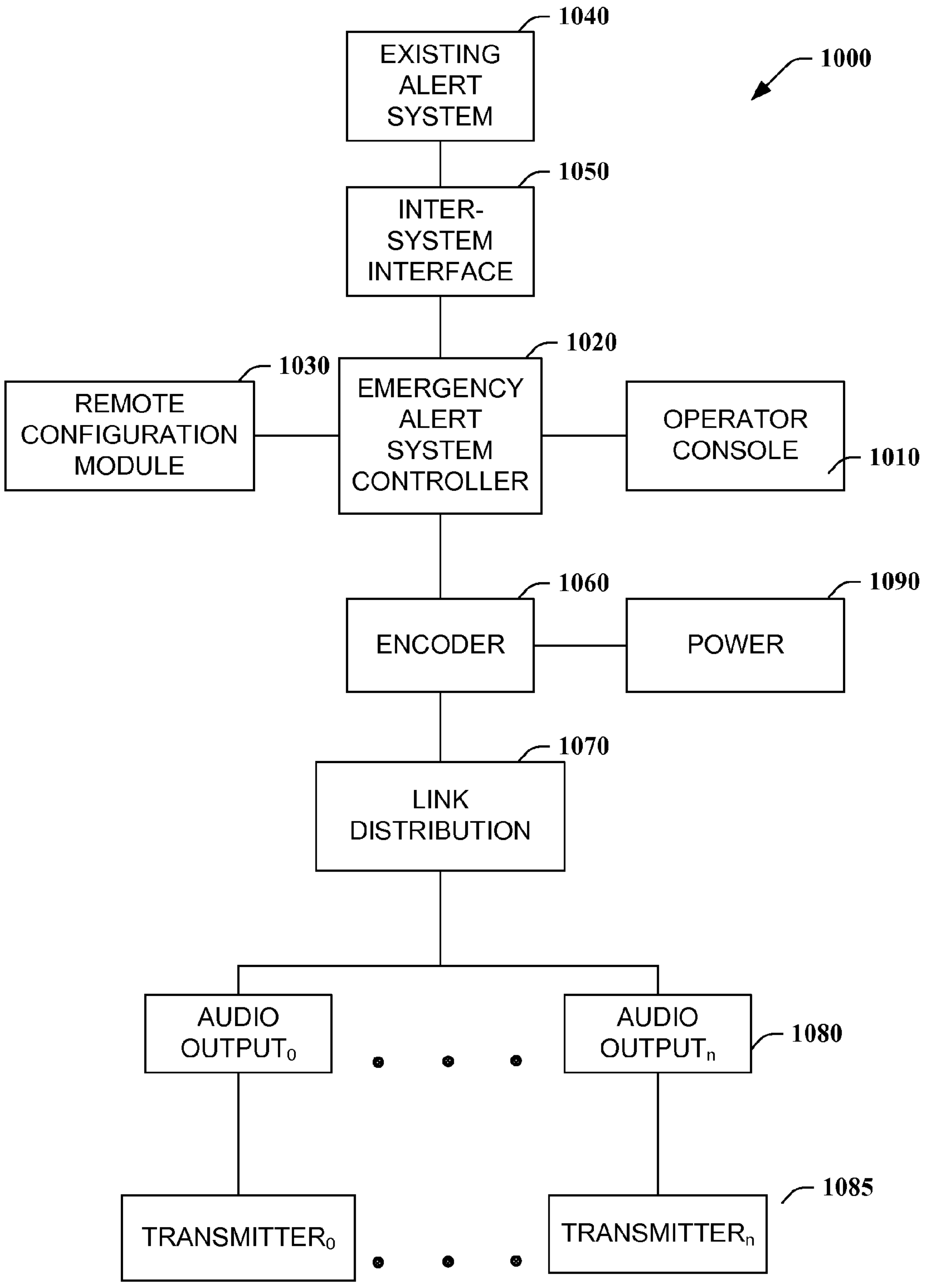
FIG. 10 is a system block diagram of an emergency messaging system controller.

FIG. 10 is a system block diagram of an emergency messaging system controller 1000. The emergency messaging system controller 1000 can be used to provide emergency messages for a group of people affected by an emergency situation. Additionally, the emergency messaging system controller 1000 can be coupled with an existing emergency alert system, such as a public address announcement system or warning siren system, among others.

The emergency messaging system controller 1000 can include an operator console 1010. The operator console 1010 can be implemented as one of the consoles previously described. An emergency alert system controller 1020 can accept commands from the operator console 1010. A remote configuration module 1030 can be used to configure the emergency alert system controller 1020. In this specific example, the remote configuration module 1030 can connect to the emergency alert system controller 1020 over the public switched telephone network ("PSTN") and can use that network as a data conduit to carry configuration commands and information to the emergency alert system controller 1020. Another suitable wired or wireless data or communication link, including optical fiber, coaxial cable, Ethernet cable, IEEE 1394, universal serial bus ("USB"), wireless USB, IEEE 802.x, or satellite communication link, among others, can also be used. A variety of suitable communications protocols, including transmission control protocol ("TCP"), user datagram protocol ("UDP"), Internet Protocol ("IP"), code division multiple access ("CDMA"), global system for mobile communications ("GSM"), and others, can be used in conjunction with a chosen data link.

The emergency alert system controller 1020 can also connect to an already-existing alert system 1040 through an intersystem interface 1050. Details of the implementation of the intersystem interface will depend upon specific functions and capabilities of the existing alert system 1040. Such functions may include flashing alert lights, sounding sirens or horns, or audibly broadcasting alert messages, among others.

An encoder 1060 can accept an emergency message from the emergency alert system controller 1020 and send that message to a line amplifier 1070. The link distribution unit 1070 can operate one or more audio outputs 1080. The audio outputs 1080 can send an audio output signal to one or more transmitters 1085. Each of the one or more transmitters 1085 can wirelessly transmit a signal to one or more audio devices (not shown) which can include sirens, horns, or loudspeakers, among other things. A power source 1090 can provide electrical power to operate the system.

Figure 11:
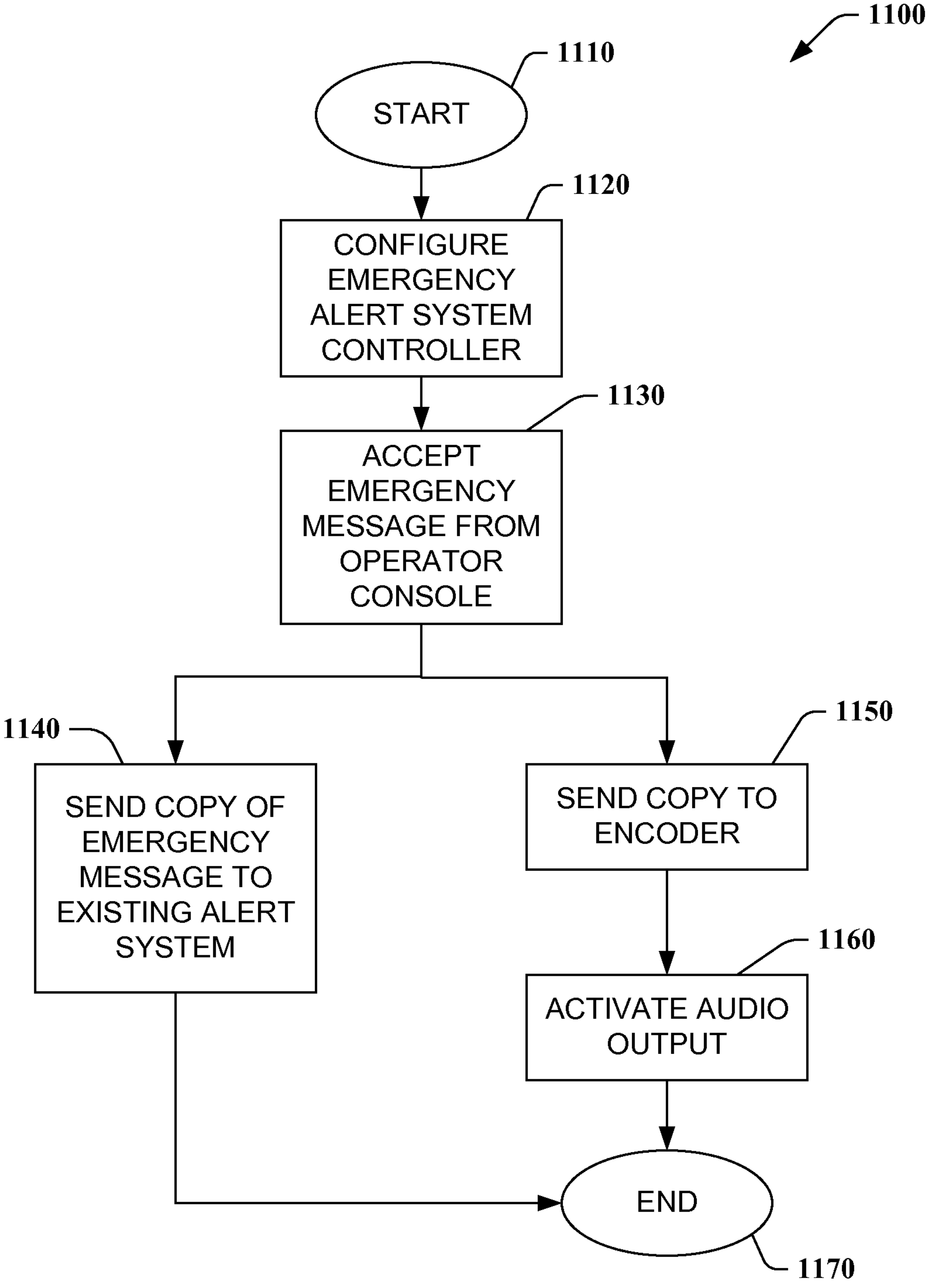
FIG. 11 is a flow diagram depicting operational steps of an emergency messaging system controller.

FIG. 11 is a flow diagram depicting steps of a method of operating an emergency messaging system controller 1100. Processing of the method begins at START block 1110 and continues to process block 1120 where the emergency alert system controller is configured. At process block 1130, an emergency message is accepted from an operator console. Processing continues at process block 1140 a copy of the emergency message is sent to an existing alert system. Additionally or alternatively, and depending upon details of the existing alert system, a notification or activation signal can be sent to the existing alert system.

At process block 1150, a copy of the emergency message is sent to the encoder. Processing continues at process block 1160 where an audio output is activated. Processing from either process block 1140 or process block 1160 terminates at END block 1170.

Figure 12:
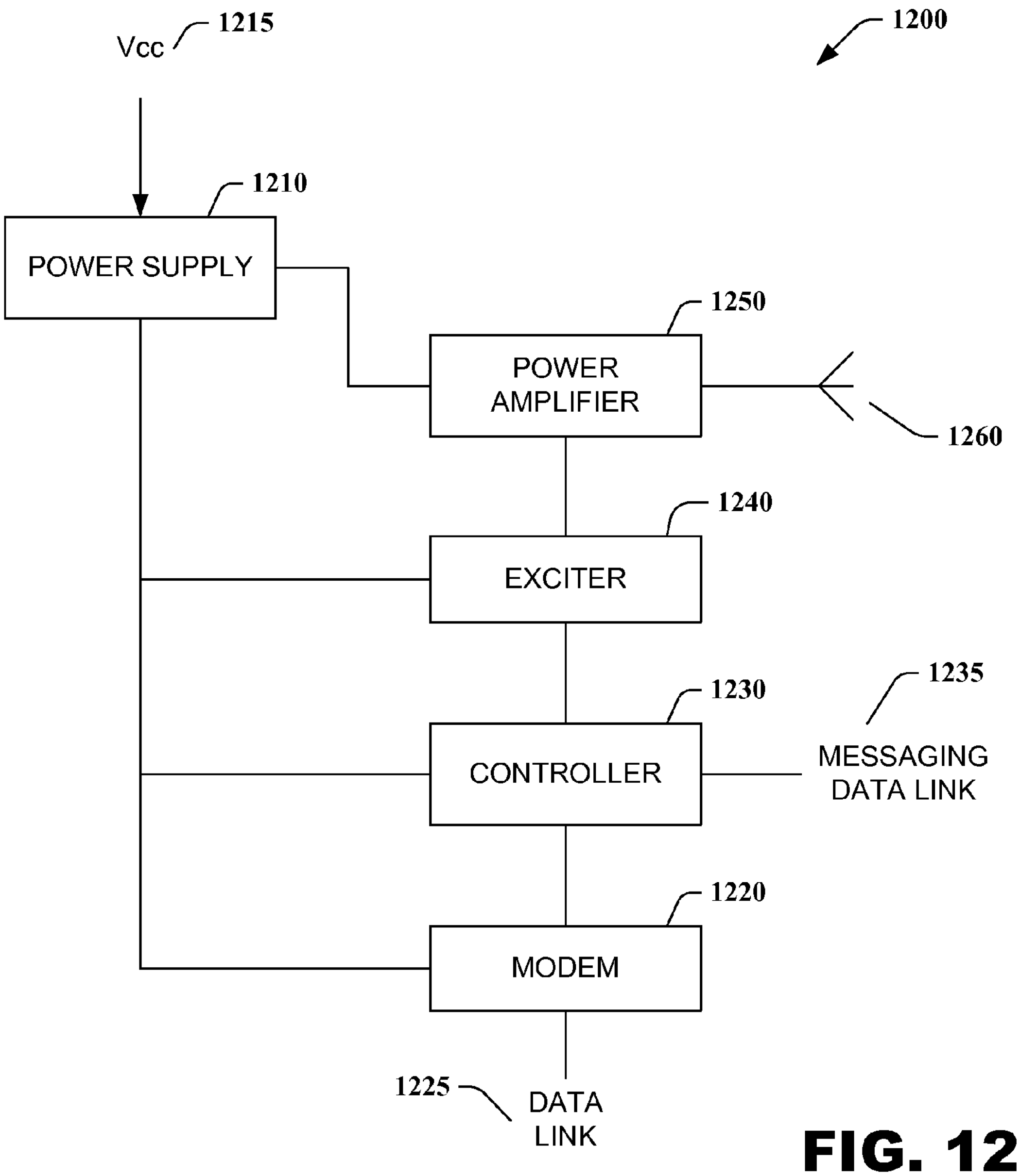
FIG. 12 is a system block diagram of an emergency messaging system transmitter.

FIG. 12 is a system block diagram of an emergency messaging system transmitter 1200. The emergency messaging system transmitter 1200 can be used to transmit an emergency message over a radio frequency signal to one or more RF receivers. Such RF receivers can include a keychain messaging device as described in conjunction with FIGS. 2A and 2B, above.

The emergency messaging system transmitter 1200 can be powered by a power supply 1210 which can manage electric current 1215. A modem 1220 can accept data signals sent over a data connection, such as the data link 1225. The data link 1225 can be implemented as a wired or wireless data or communication link, including links using PSTN, optical fiber, coaxial cable, Ethernet cable, IEEE 1394, universal serial bus ("USB"), wireless USB, IEEE 802.x, and satellite communications, among others. Specifically, the data link 1225 can be used to transmit information such as fault alarm information. A controller 1230 can accept data signals through a data link 1235. These data signals can include inbound emergency messages. An exciter 1240 can set frequency of a message transmission. A power amplifier 1250 can amplify signals that are transmitted by an antenna 1260.

Figure 13:
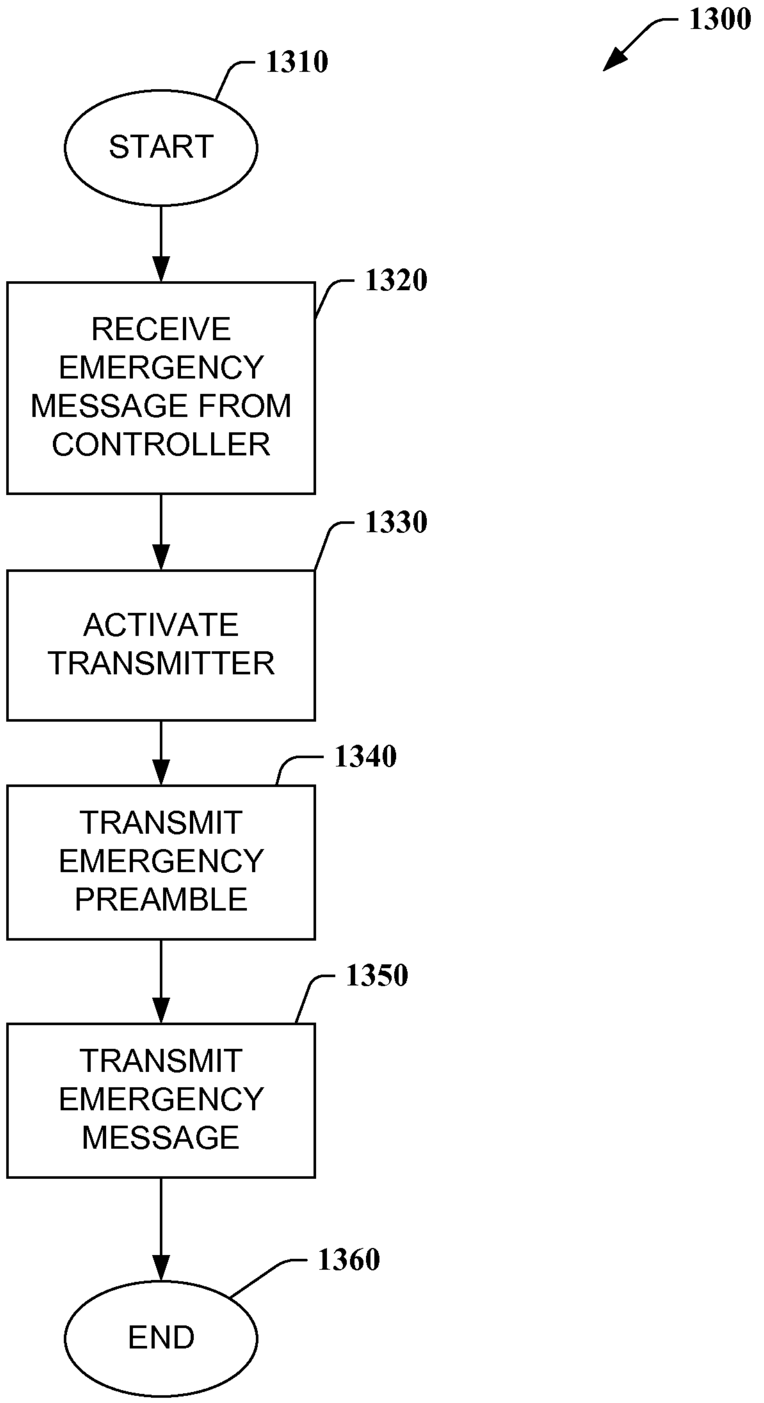
FIG. 13 is a flow diagram depicting operational steps of an emergency message transmitter.

FIG. 13 is a flow diagram depicting steps of a method of operating an emergency message transmitter 1300. Execution of the method begins at START block 1310 and continues to process block 1320 where an emergency message is received from a controller. At process block 1330, a transmitter is activated. Processing continues at process block 1340 where a special message preamble that designates broadcast of an emergency message is transmitted. The emergency message itself is transmitted at process block 1350. Processing terminates at END block 1360.

The above descriptions of various components and methods are intended to illustrate specific examples and describe certain ways of making and using the devices disclosed and described here. These descriptions are neither intended to be nor should be taken as an exhaustive list of the possible ways in which these components can be made and used. A number of modifications, including substitutions of components between or among examples and variations among combinations can be made. Those modifications and variations should be apparent to those of ordinary skill in this area after having read this document.

What is claimed is:

1. An electronic alert apparatus, comprising:

a radio frequency receiver configured to receive, at a first data rate, and identify an emergency message preamble that indicates an impending transmission at a second data rate of an encoded emergency message to a shared device address, and receive, at a second data rate, the encoded emergency message;

a processor operatively connected to the radio frequency receiver and configured to decode the encoded emergency message to create a decoded emergency message;

a memory operatively connected to the processor and configured to store the decoded emergency message;

a display operatively connected to the controller and configured to present the decoded emergency message;

a power source configured to supply electrical power to the processor, and a housing configured to at least partially enclose the processor, the memory, and the power source.

2. The electronic alert apparatus of claim 1, wherein the display includes a backlight that is configured to be selectively activated by the processor.

3. The electronic alert apparatus of claim 2, further comprising a transducer operatively connected to the processor and configured to emit an audible alert to indicate receipt of the encoded emergency message.

4. The electronic alert apparatus of claim 3, further comprising a vibrator operatively connected to the processor and configured to vibrate to indicate receipt of the encoded emergency message.

5. The electronic alert apparatus of claim 4, further comprising an alert light operatively connected to the processor and configured to activate to indicate receipt of the encoded emergency message.

6. The electronic alert apparatus of claim 5, further comprising a voice synthesizer configured to emit a warning in a human-understandable language.

7. The electronic alert apparatus of claim 6, wherein the housing is further configured to permit attachment to a retaining ring.

8. The electronic alert apparatus of claim 7, wherein the retaining ring is a keyring.

9. The electronic alert apparatus of claim 1, wherein the encoded emergency message is encrypted and further comprising a clock operatively connected to the processor and configured to maintain a date and time reference, and wherein the processor is further configured to calculate a value from the date and time reference and use the value to decrypt the encoded emergency message.

10. The electronic alert apparatus of claim 9, wherein the display includes a backlight that is configured to be operable by the processor.

11. The electronic alert apparatus of claim 10, further comprising a transducer operatively connected to the processor and configured to emit an audible alert to indicate receipt of the encoded emergency message.

12. The electronic alert apparatus of claim 11, further comprising a vibrator operatively connected to the processor and configured to vibrate to indicate receipt of the encoded emergency message.

13. The electronic alert apparatus of claim 12, further comprising an alert light operatively connected to the processor and configured to activate to indicate receipt of the encoded emergency message.

14. The electronic alert apparatus of claim 13, further comprising a voice synthesizer configured to emit a warning in a human-understandable language.

15. The electronic alert apparatus of claim 14, wherein the housing is further configured to permit attachment to a retaining ring.

16. The electronic alert apparatus of claim 15, wherein the retaining ring is a keyring.

17. The electronic alert apparatus of claim 1, further comprising a power management circuit operatively connected to the processor and configured to switch the processor from a storage mode to an active mode.

18. The electronic alert apparatus of claim 17, wherein the display includes a backlight that is configured to be operable by the processor.

19. The electronic alert apparatus of claim 18, further comprising a transducer operatively connected to the processor and configured to emit an audible alert to indicate receipt of the encoded emergency message.

20. The electronic alert apparatus of claim 19, further comprising a vibrator operatively connected to the processor and configured to vibrate to indicate receipt of the encoded emergency message.

21. The electronic alert apparatus of claim 20, further comprising an alert light operatively connected to the processor and configured to activate to indicate receipt of the encoded emergency message.

22. The electronic alert apparatus of claim 21, further comprising a voice synthesizer configured to emit a warning in a human-understandable language.

23. The electronic alert apparatus of claim 22, wherein the housing is further configured to permit attachment to a retaining ring.

24. The electronic alert apparatus of claim 23, wherein the retaining ring is a keyring.

25. A method for obtaining alert messages, comprising the steps of:

receiving, at a first data rate, a message preamble, identifying the message preamble as an emergency preamble that indicates impending transmission, at a second data rate, an encoded emergency message to a shared device address;

receiving, at a second data rate, the encoded emergency message;

decoding the encoded emergency message;

storing the decoded message in a memory; and presenting the decoded message on a display.

26. The method of claim 25, further comprising the step of emitting an audible alert to indicate receipt of the encoded emergency message.

27. The method of claim 26, further comprising the step of activating a vibrator to indicate receipt of the encoded emergency message.

28. The method of claim 27, further comprising the step of activating a light to indicate receipt of the encoded emergency message.

29. The method of claim 25, wherein the encoded emergency message is encrypted and further comprising the step of decrypting the encoded emergency message.

30. The method of claim 29, further comprising the step of emitting an audible alert to indicate receipt of the encoded emergency message.

31. The method of claim 30, wherein the audible alert is an alert selected from the group consisting of a synthesized voice and a recorded voice.

32. The method of claim 31, further comprising the step of activating a vibrator to indicate receipt of the encoded emergency message.

33. The method of claim 32, further comprising the step of activating a light to indicate receipt of the encoded emergency message.

34. An electronic alert apparatus, comprising:

means for receiving radio frequency transmissions configured to receive, at a first data rate, and identify an emergency message preamble that indicates an impending transmission, at a second data rate, of an encoded emergency message to a shared device address, and receive, at a second data rate, the encoded emergency message;

a processor operatively connected to the radio frequency receiver and configured to decode the encoded emergency message to create a decoded emergency message;

a memory operatively connected to the processor and configured to store the decoded emergency message;

a display operatively connected to the controller and configured to present the decoded emergency message;

a power source configured to supply electrical power to the processor, and a housing configured to at least partially enclose the processor, the memory, and the power source.

35. The electronic alert apparatus of claim 34, wherein the display includes a backlight that is configured to be operable by the processor.

36. The electronic alert apparatus of claim 35, further comprising means for emitting an audible alert operatively connected to the processor.

37. The electronic alert apparatus of claim 36, further comprising a vibrator operatively connected to the processor and configured to vibrate to indicate receipt of the encoded emergency message.

38. The electronic alert apparatus of claim 37, further comprising an alert light operatively connected to the processor and configured to activate to indicate receipt of the encoded emergency message.

39. The electronic alert apparatus of claim 38, wherein the housing is further configured to permit attachment to a retaining ring.

40. The electronic alert apparatus of claim 39, wherein the retaining ring is a keyring.

41. The electronic alert apparatus of claim 34, wherein the encoded emergency message is encrypted and further comprising a clock operatively connected to the processor and configured to maintain a date and time reference and wherein the processor is further configured to calculate a value from the date and time reference and use the value to decrypt the encoded emergency message.

42. The electronic alert apparatus of claim 41, wherein the display includes a backlight that is configured to be operable by the processor.

43. The electronic alert apparatus of claim 42, further comprising a transducer operatively connected to the processor and configured to emit an audible alert to indicate receipt of the encoded emergency message.

44. The electronic alert apparatus of claim 43, further comprising a vibrator operatively connected to the processor and configured to vibrate to indicate receipt of the encoded emergency message.

45. The electronic alert apparatus of claim 44, further comprising an alert light operatively connected to the processor and configured to light to indicate receipt of the encoded emergency message.

46. The electronic alert apparatus of claim 45, wherein the housing is further configured to permit attachment to a retaining ring.

47. The electronic alert apparatus of claim 46, wherein the retaining ring is a keyring.

48. The electronic alert apparatus of claim 34, further comprising a power management circuit operatively connected to the processor and configured to switch the processor from a storage mode to an active mode.

49. The electronic alert apparatus of claim 48, wherein the display includes a backlight that is configured to be operable by the processor.

50. The electronic alert apparatus of claim 49, further comprising means for emitting an audible alert operatively connected to the processor.

51. The electronic alert apparatus of claim 50, further comprising a vibrator operatively connected to the processor and configured to vibrate to indicate receipt of the encoded emergency message.

52. The electronic alert apparatus of claim 51, further comprising an alert light operatively connected to the processor and configured to light to indicate receipt of the encoded emergency message.

53. The electronic alert apparatus of claim 52, wherein the housing is further configured to permit attachment to a retaining ring.

54. The electronic alert apparatus of claim 53, wherein the retaining ring is a keyring.

55. An emergency messaging system, comprising:

- an operator interface configured to accept entry of an emergency message;
- an encoding module configured to
  - create an emergency preamble configured to indicate an impending transmission of the emergency message; and
  - encode the emergency message according to a predetermined messaging protocol to create an encoded message;
- an addressing module configured to associate the encoded message with a shared device identifier; and
- a transmission module configured to
  - cause the emergency preamble to be broadcast at a first data rate, and
  - cause the emergency message to be broadcast with the shared device identifier at a second data rate.

56. The emergency messaging system of claim 55, further comprising an access control module operatively connected to the operator interface and configured to selectively permit access to the emergency messaging system to a previously authorized operator.

57. The emergency messaging system of claim 56, wherein the access control module is one of a token-based authentication system, username-password authentication system, a biometric authentication system, and a multi-factor authentication system.

58. The emergency messaging system of claim 57, further comprising an encryption module configured to encrypt at least one of the emergency message and the encoded message prior to broadcast.

59. The emergency messaging system of claim 58, wherein the encryption module is configured to apply at least one of a private key algorithm, a public key algorithm, a symmetric key algorithm, an asymmetric key algorithm, a one-time pad algorithm, an elliptic curve algorithm, and a quantum encryption algorithm.

60. The emergency messaging system of claim 59, wherein the operator interface includes a message selection module configured to permit selection of a message as the emergency message from among a set of prepared messages.

61. The emergency messaging system of claim 55, further comprising a transmitter configured to receive the emergency message and to broadcast the emergency message.

62. The emergency messaging system of claim 61, wherein the transmitter is further configured to activate an audible alert associated with the emergency message.

63. The emergency messaging system of claim 62, wherein the audible alert is an alert selected from the group consisting of a synthesized voice and a recorded voice.

64. The emergency messaging system of claim 63, further comprising an access control module operatively connected to the operator interface and configured to selectively permit access to the emergency messaging system to a previously authorized operator.

65. The emergency messaging system of claim 64, wherein the access control module is one of a token-based authentication system, username-password authentication system, a biometric authentication system, and a multi-factor authentication system.

66. The emergency messaging system of claim 65, further comprising an encryption module configured to encrypt at least one of the emergency message and the encoded message prior to broadcast.

67. The emergency messaging system of claim 66, wherein the encryption module is configured to apply at least one of a private key algorithm, a public key algorithm, a symmetric key algorithm, an asymmetric key algorithm, a one-time pad algorithm, an elliptic curve algorithm, and a quantum encryption algorithm.

68. The emergency messaging system of claim 67, wherein the operator interface includes a message selection module configured to permit selection of a message as the emergency message from among a set of prepared messages.

69. A method for distributing an emergency message, comprising the steps of:

- accepting an emergency message entered at an operator interface;
- creating an encoded message by encoding the emergency message according to a predetermined messaging protocol;
- creating an addressed message by addressing the encoded message with a shared device identifier;
- instructing a transmitter to broadcast an emergency preamble that is configured to indicate an impending transmission of the emergency message at a first data rate; and
- instructing a transmitter to broadcast the addressed message at a second data rate.

70. The method for distributing an emergency message of claim 69, further comprising the step of selectively permitting access to the operator interface to a previously authorized operator.

71. The method for distributing an emergency message of claim 70, further comprising the step of encrypting at least one of the emergency message, the encoded message, and the addressed message.

72. The method for distributing an emergency message of claim 71, wherein the step of accepting an emergency message includes the step of selecting a message from among a set of prepared messages for use as the emergency message.

73. The method for distributing an emergency message of claim 72, further comprising the step of broadcasting the addressed message.

74. The method for distributing an emergency message of claim 73, further comprising the step of activating an audible alert associated with the addressed message.

75. The method for distributing an emergency message of claim 74, further comprising the step of emitting the audible alert and wherein the audible alert is an alert selected from the group consisting of a synthesized voice and a recorded voice.

* * * * *